(12) United States Patent
Sugaya

(10) Patent No.: US 8,936,048 B2
(45) Date of Patent: Jan. 20, 2015

(54) COPPER AND ZINC ELUTION PREVENTING METHOD OF COPPER-ALLOY-MADE PLUMBING INSTRUMENT INCLUDING VALVE AND PIPE JOINT, COPPER-ALLOY-MADE PLUMBING INSTRUMENT USING THE METHOD, AND FILM-FORMING AGENT

(75) Inventor: Norikazu Sugaya, Chiba (JP)

(73) Assignee: Kitz Corporation, Chiba (JP)

( * ) Notice: Subject to any disclaimer, the term of this patent is extended or adjusted under 35 U.S.C. 154(b) by 425 days.

(21) Appl. No.: 13/241,784

(22) Filed: Sep. 23, 2011

(65) Prior Publication Data
US 2012/0125458 A1   May 24, 2012

(30) Foreign Application Priority Data

Nov. 22, 2010   (JP) .................. 2010-260169
Sep. 21, 2011   (JP) .................. 2011-205881

(51) Int. Cl.
| | | |
|---|---|---|
| F16L 58/04 | (2006.01) |
| B05D 7/22 | (2006.01) |
| C23F 11/10 | (2006.01) |
| C23C 28/00 | (2006.01) |
| C23C 2/02 | (2006.01) |
| C23F 11/12 | (2006.01) |

(52) U.S. Cl.
CPC ............. C23C 28/00 (2013.01); F16L 58/04 (2013.01); C23C 2/02 (2013.01); C23F 11/126 (2013.01)
USPC .......................................... 138/145; 427/239

(58) Field of Classification Search
None
See application file for complete search history.

(56) References Cited

FOREIGN PATENT DOCUMENTS

| | | |
|---|---|---|
| EP | 1 722 010 A1 * | 11/2006 |
| JP | 63-303079 | 12/1988 |
| JP | 2001-49464 | 2/2001 |
| JP | 3182765 | 4/2001 |
| JP | 3345569 | 8/2002 |
| JP | 2002-294471 | 10/2002 |
| JP | 4197269 | 10/2008 |
| JP | 2009-242851 | 10/2009 |

* cited by examiner

Primary Examiner — William Phillip Fletcher, III
(74) Attorney, Agent, or Firm — Wenderoth, Lind & Ponack, L.L.P.

(57) ABSTRACT

A method is provided for preventing copper and zinc from being eluted from a copper-alloy-made plumbing instrument that includes valves and pipe joints and suppresses copper and zinc from being eluted from the copper-alloy-made plumbing instrument while using for the plumbing instrument copper alloy as-is that includes bronze and brass, to provide a copper-alloy-made plumbing instrument using the method and to provide a film-forming agent. The method forms on at least a liquid-contact portion of the copper-alloy-made plumbing instrument a film of an organic substance comprising unsaturated fatty acid and coating with the film both copper and zinc in the surface layer of the liquid-contact portion of the plumbing instrument, thereby suppressing the elution of copper and zinc.

14 Claims, 10 Drawing Sheets

COPPER AND ZINC ELUTION PREVENTING METHOD OF COPPER-ALLOY-MADE PLUMBING INSTRUMENT INCLUDING VALVE AND PIPE JOINT, COPPER-ALLOY-MADE PLUMBING INSTRUMENT USING THE METHOD, AND FILM-FORMING AGENT

BACKGROUND OF THE INVENTION

1. Field of the Invention

The present invention relates to a method for preventing copper and zinc from being eluted from a copper-alloy-made plumbing instrument including valves, pipe joints, water faucets and copper pipes, to a copper-alloy-made plumbing instrument using the method and to a film-forming agent.

2. Description of the Prior Art

Usually, copper alloy including bronze and brass is excellent in castability, machinability and economy and is generally used widely as a material for a plumbing instrument including valves and pipe joints for water service, water supply and hot-water supply, strainers, faucets and copper pipes because it exhibits a high antibacterial action other materials are difficult to exhibit.

Tap water is set to suit the water quality standard established by the Ministerial Ordinance on Water Quality Standard under Article 4 of Japan Water Works Law. The water quality standard of tap water includes substances set as an item on health and substances set as an item on properties tap water should have, and copper and zinc belong to the latter item.

Copper, an element, is indispensable to human beings, and it is held that the amount of copper necessary for adults is 2 mg/day. However, tap water containing copper in the amount of 1.0 mg/l or more takes on a metallic taste and such a level colors laundry and induces contamination in plumbing equipment. Therefore, the water quality standard sets that the amount of copper in water is less than 1.0 mg/l. Incidentally, though copper is an indispensable element, human beings having ingested copper over an allowable amount suffer from attack of fever, abdominal pains, bout of vomiting, big split, mouth dryness, breathing disorder, bluely coated tongue and cirrhosis and are possibly hemolyzed.

Zinc, an element, is also indispensable to human beings, and it is held that the amount of zinc necessary for adults is 15 to 22 mg/day. However, when tap water containing zinc in the amount of 1.0 mg/l or more has been brought to a boil, it is made cloudy to destroy tea flavor, and tap water containing zinc in the amount of 3.0 mg/l is made cloudy to induce white water. Furthermore, tap water containing zinc in the amount of 5.0 mg/l or more induces an astringent taste and, when having being placed in a bath, we have found a case where oil film float on the surface of the tap water. In view of these facts, the amount of zinc under the water quality standard is generally set to be 1.0 mg/l or less from the standpoints of taste sense and color. Incidentally, though zinc is an indispensable element, human beings having ingested zinc over an allowable amount possibly undergo the manifestation of toxicity including abdominal pains, big split and diarrhea.

For these reasons, in the Ministerial Ordinance on Water Quality Standard, for example, the water-supply equipment elution performance standards for individual copper-alloy-made plumbing instruments including valves, pipe joints, faucets and copper pipes have been established, and observing the water quality standards has aspired. Valves and pipe joints belong to the classification of water-supply implements or water-supply pipes other than the fringe of the water-supply equipment elution performance standards, in which the standard value of copper is 1.0 mg/l and that of zinc is 1.0 mg/l. Faucets belong to the classification of faucet and other fringe water-supply implements of the water-supply equipment elution performance standards, in which the standard value of copper is 0.1 mg/l and that of zinc is 0.1 mg/l as shown in the table of JIS B2061 water-supply faucets. In the single faucets and hot-water and water mixing faucets using copper alloy, the standard value of copper and that of zinc are set to be 0.98 mg/l, respectively, as the special case values.

In the meantime, it has been reported that in some of recent drinking water treatment plants using copper-alloy-made plumbing instruments, the concentration of copper in tap water exceeds 50% or more of the water quality standard. Since it is conceivable that the main sources of lixiviation thereof are valves, pipe joints and faucets made of copper alloy including bronze or brass made preponderantly of copper and zinc, further elution prevention countermeasures have been needed.

Methods for preventing elements contained in copper-alloy-made liquid-contact members from being eluted or protecting the surfaces of the members have been proposed in the following Patent Documents. The lead elution prevention method of Patent Document 1, for example is directed to removal of lead on the surface of a plumbing instrument through washing the surface with acid. The lead elution reduction treatment method of Patent Document 2 is directed to removal of lead of the surface through immersing lead-containing copper alloy in an alkaline etching solution having an oxidant added thereto. The nickel elution prevention method of Patent Document 3 comprises washing with acid nickel salt adhering to the surface layer of a liquid-contact portion of a plumbing instrument plated with nickel, removing the nickel salt by washing and forming a coat on the surface of the liquid-contact portion with hydrochloric acid to undergo a denickelification treatment. On the other hand, as a method for preventing the elution of harmful elements through coating the surface of copper alloy, a plating construction method has also been used. In this case, plating materials for coating the surface of copper alloy include NiCr coat, Ni coat, tin coat, silver coat, gold coat, platinum coat, rhodium coat, palladium coat, iridium coat and hard chrome.

Other related conventional techniques are proposed in Patent Documents 4 to 7. Patent Document 4 relates to a technique for preventing occurrence of verdigris, comprising immersing copper-alloy-made faucet equipment in an aqueous organic acid solution to selectively elute zinc and lead and form a film through bonding of the surface copper and the organic acid. Patent Document 5 relates to a technique of forming a lead elution prevention layer containing a substance having lead-selection complementation on the surface of copper alloy that is water-contact member and forming thereon a layer containing a water-repellent substance, wherein the water-repellent substance is silicone or fluorine resin. Furthermore, Patent Document 6 relates to a technique on surface treatment of chemically plating the surface of a copper molded article with an alloy film of antimony and nickel, and Patent Document 7 relates to a technique for suppressing elution of nickel, comprising applying protective film formation agent containing wax to the surface of a copper-alloy-made liquid-contact instrument treated with nickel plating.

PRIOR ART DOCUMENTS

Patent Documents

Patent Document 1: Japanese Patent No. 3345569
Patent Document 2: Japanese Patent No. 3182765

Patent Document 3: Japanese Patent No. 4197269
Patent Document 4: JP-A-2002-294471
Patent Document 5: JP-A-2001-49464
Patent Document 6: JP-A-63-303079
Patent Document 7: JP-A-2009-242851

SUMMARY OF THE INVENTION

Problems the Invention Intends to Solve

However, Patent Documents 1 to 3 relate absolutely to a method for preventing elution of lead in copper alloy or nickel in plating and a method for removing partial target metal contained in a main element from a liquid-contact surface. Therefore, these elution prevention methods cannot be used as a method for removing copper and zinc that are main components constituting copper alloy. On the other hand, though it is possible to suppress elution of copper or zinc in the case where the inner circumferential surface of a plumbing instrument has been treated by means of a plating construction method, a risk of eluting a plating metal material per se will be induced. Furthermore, tin coat used as the plating material has demerits in which it has soft hardness and is inferior in exterior beutification. Use of rare metal coat, such as silver coat, gold coat, platinum coat, rhodium coat, palladium coat or iridium coat, or use of alloy coat composed of plural elements will be costly. In addition, in the case of coat, such as hard chrome coat, aiming at strengthening surface hardness, when plating with such coat has been applied up to the surface of a screw portion and the surface of a sliding portion for reducing elution, the respective plated surfaces are susceptible to fraction because these are hard and, in this case, fractioned fines will clog the screw portion and scratch the surfaces to possibly adversely affect the specification itself of a water implement due to galling and leakage resulting from flows of the surfaces formed by the fractioned fines. Thus, it is not preferable to apply plating on the inner circumferential surface of a plumbing instrument for the purpose of suppressing elution of copper or zinc.

Furthermore, Patent Document 4 relates to the technique in which zinc and lead are selectively eluted through the immersion in the aqueous organic acid solution to form a film in consequence of the bond of the exposed copper and the solution and, inversely when zinc and lead are insufficiently eluted, no organic acid film is formed to make progress of corrosion. Patent Document 5 relates to a water-contact member that has free-cutting, prevents elution of lead and is less liable to permit adhesion of water stain and scale and does not relate to a method for preventing elution of copper and zinc in a copper-alloy-made plumbing instrument. Patent Document 6 relates to a method of subjecting the surface of a copper molded article to chemical plating to attain surface protection of copper alloy. Patent Document 7 relates to a technique of suppressing elution of nickel. Thus, none of these relates to a technique not to elute copper and zinc in a copper-alloy-made plumbing instrument. For these reasons, it is anxious to develop a technique enabling elution of copper and zinc contained in copper alloy to be suppressed.

The present invention has come to be developed as a result of the keen studies for solving the problems described above, and the object thereof is to provide a method for preventing copper and zinc from being eluted from a copper-alloy-made plumbing instrument that includes valves and pipe joints and suppresses copper and zinc from being eluted from the copper-alloy-made plumbing instrument while using for the plumbing instrument copper alloy as-is that includes bronze and brass, is excellent in castability, machinability and economy and exhibits a high antibacterial action other materials are difficult to exhibit, to provide a copper-alloy-made plumbing instrument using the method and to provide a film-forming agent.

SUMMARY OF THE INVENTION

Means for Solving the Problems

To attain the above object, the invention set forth in claim 1 relates to a method for preventing copper and zinc from being eluted from a copper-alloy-made plumbing instrument that includes valves and pipe joints, comprising using an organic substance comprising unsaturated fatty acid to form a film on at least a liquid-contact portion of the copper-alloy-made plumbing instrument and coating copper and zinc in a surface layer of the liquid-contact portion of the copper-alloy-made plumbing instrument to suppress elution of the copper and zinc.

The invention set forth in claim 2 relates to a method for preventing copper and zinc from being eluted from a copper-alloy-made plumbing instrument that includes valves and pipe joints, wherein the unsaturated fatty acid is an organic substance containing mono-unsaturated fatty acid or di-unsaturated fatty acid.

The invention set forth in claim 3 relates to a method for preventing copper and zinc from being eluted from a copper-alloy-made plumbing instrument that includes valves and pipe joints, wherein the mono-unsaturated fatty acid is an organic substance containing oleic acid or the di-unsaturated fatty acid is an organic substance containing linoleic acid.

The invention set forth in claim 4 relates to a method for preventing copper and zinc from being eluted from a copper-alloy-made plumbing instrument that includes valves and pipe joints, further comprising a drying step of drying the plumbing instrument having the film of unsaturated fatty acid that contains the oleic acid at a predetermined temperature of 200° C. or less, or having the film of unsaturated fatty acid that contains the linoleic acid at a predetermined temperature of 100° C. or less.

The invention set forth in claim 5 relates to a method for preventing copper and zinc from being eluted from a copper-alloy-made plumbing instrument that includes valves and pipe joints, further comprising a step of retaining the plumbing instrument at a drying temperature of 50 to 70° C. to moderately evaporate wet of an aqueous organic film solution and a step of elevating the drying temperature to the predetermined temperature to take the drying step.

The invention set forth in claim 6 relates to a copper-alloy-made plumbing instrument that includes valves and pipe joints, using the method for preventing copper and zinc from being eluted from a copper-alloy-made plumbing instrument that includes valves and pipe joints to suppress elution of copper and zinc in the surface layer of at least the liquid-contact portion.

The invention set forth in claim 7 relates to a film-forming agent comprising an organic substance that comprises unsaturated fatty acid for forming a film on a surface layer of at least a liquid-contact portion of a copper-alloy-made plumbing instrument.

Effects of the Invention

According to the invention set forth in claim 1, by coating the copper alloy of the surface layer of the liquid-contact portion with the film, it is possible to suppress the elution of copper and zinc. For this reason, it is possible to suppress the amount of copper and zinc eluted from the copper-alloy-made plumbing instrument including valves, pipe joints, strainers, faucets and copper pipes made of copper alloy. Furthermore, since double bond the unsaturated fatty acid exhibits after the film is formed shorten the distance between adjacent molecules of the unsaturated fatty acid bonded to the copper and zinc contained in the copper alloy to increase the density of the film, thereby enabling the elution of the copper and zinc from being infallibly prevented. Therefore, it becomes possible to infallibly prevent the phenomenon of eluting copper or zinc off tap water and obtain a favorable plumbing instrument.

According to the invention set forth in claim 2, by coating with the film the zinc in the copper alloy on the surface layer of the liquid-contact portion using, of unsaturated fatty acids, mono-unsaturated fatty acid or di-unsaturated fatty acid which naturally exists in abundance to be economical and which does for mass productivity, it is possible to suppress the elution of copper and zinc.

According to the invention set forth in claim 3, large effects of enhancing the density of the film to heighten the function of preventing the elution of copper and zinc and of preventing oxidization to prevent odor from occurring can be obtained.

According to the invention set forth in claim 4, chemical reaction of the double bond contained in a molecular structure is suppressed to prevent reaction of the unsaturated fatty acid per se and also prevent thermal decomposition of the surface film of oleic acid or linoleic acid, thereby enabling copper or zinc to be infallibly prevented from being eluted from the plumbing instrument.

According to the invention set forth in claim 5, wet of the aqueous organic film solution is prevented from being abruptly evaporated to form the homogenous surface film and suppress the elution of copper or zinc in the plumbing instrument uniformly, thereby enabling a high-quality plumbing instrument to be obtained.

According to the invention set forth in claim 6 or 7, it is possible to provide the various kinds of copper-alloy-made plumbing instruments, including valves, pipe joints, strainers, faucets and copper pipes, and the film-forming agent for preventing copper and zinc from being eluted from the surface layer of the liquid-contact portion.

DETAILED DESCRIPTION OF THE PREFERRED EMBODIMENTS

Mode for Carrying Out the Invention

Figure 1:
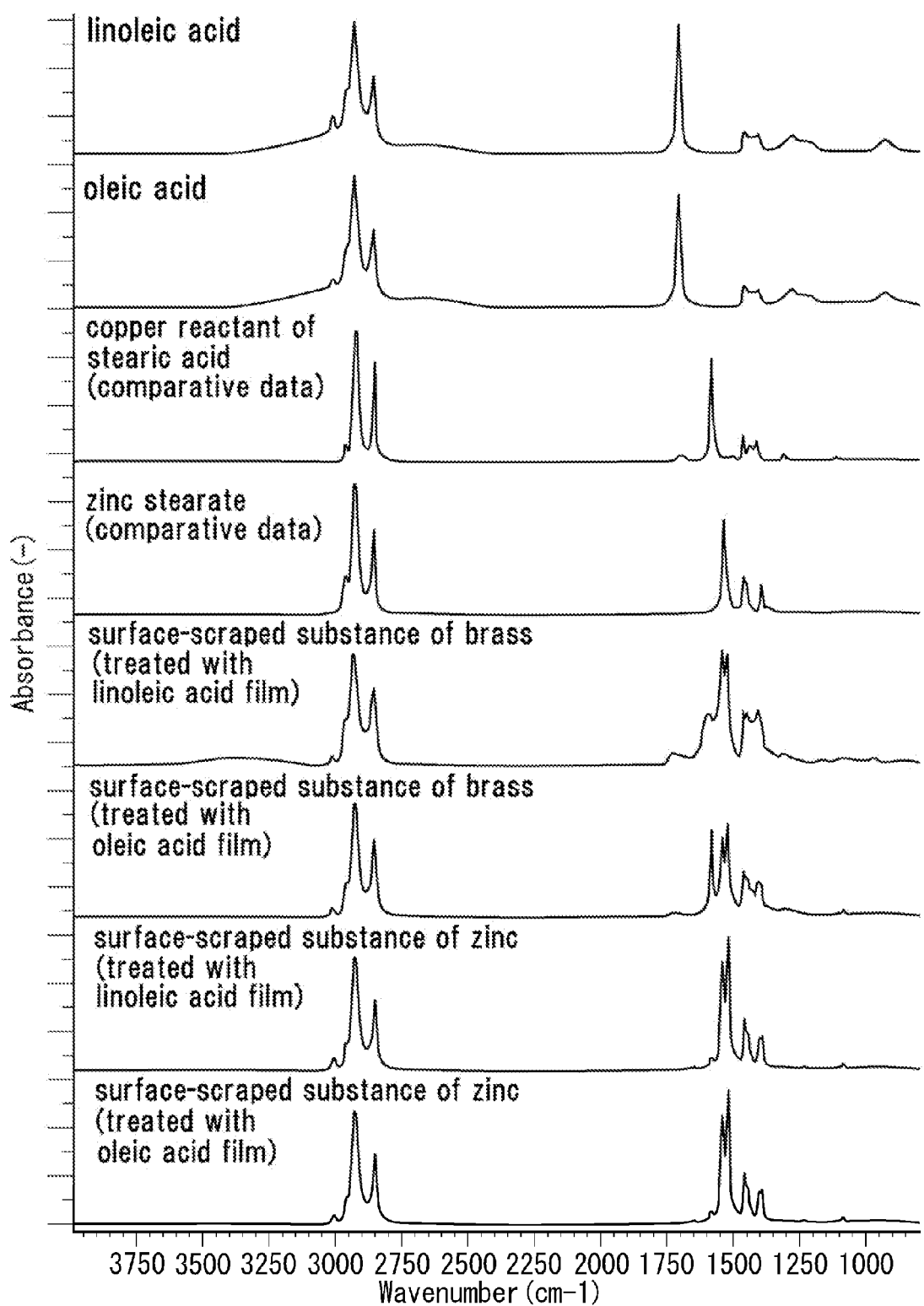
FIG. 1 shows graphs showing results of analysis of zinc articles and brass articles according to the FT-IR analysis.

Preferred embodiments of a method for preventing copper and zinc from being eluted from a copper-alloy-made plumbing instrument including valves and pipe joints, a copper-alloy-made plumbing instrument using the method and a film-forming agent according to the present invention will be described hereinafter in detail. Generally, copper alloys comprises copper of the main element and various kinds of elements added thereto. The kinds of bronze are shown in JIS H5210, for example, and those of brass in JIS H3250, for example. In this case, in the lixiviation tests of plumbing instruments including valves, pipe joints, strainers, faucets and copper pipes for a water service, water supply and hot-water supply, lixiviation of zinc in addition to that of copper of the main component has been found. While the amounts of zinc in copper alloys are different depending on the materials for the alloys, various inclinations of lixiviating copper and zinc have been found in lixiviation tests depending on the shape of a liquid-contact portion, the action of alloy components added to copper and the action of coating metal used for plating applied to faucets etc.

On the other hand, while copper and zinc are main elements constituting copper alloy, ionization inclinations thereof are greatly different. To be specific, since zinc is less noble metal because $E^0=-0.76$ V, whereas copper is noble metal because $E^0=+0.34$ V relative to $E^0=0$ V of hydrogen, solubility of copper and that of zinc to water are greatly different. In the case of brass test pieces which have metal components shown in Table 1 and a circular cylindrical shape of 20 mm in diameter and 10 mm in thickness and exhibit a liquid-contacting area ratio of 1256 cm$^2$/t, for example, the amounts of lixiviation thereof are as shown in Table 2.

TABLE 1

| Metal components of brass test piece by fluorescent X-ray analysis (wt %) | | | | |
|---|---|---|---|---|
| Cu | Zn | Pb | Sn | Others |
| 50.777 | 44.957 | 2.533 | 0.726 | 1.007 |

TABLE 2

| Lixiviation amounts of elements of brass test piece by ICP emission spectrophotometer (actual measurement value: mg/ℓ) | |
|---|---|
| Cu lixiviation amount | Zn lixiviation amount |
| 0.196 | 2.69 |

On the other hand, in the case of a test piece of pure copper (degree of purity: 99.99%) 20 mm square and 0.1 mm thick, for example, the amount of Cu lixiviated when the liquid-contacting area ratio is 1760 cm$^2$/l, is shown in Table 3.

TABLE 3

Cu lixiviation amount of pure copper test piece by ICP emission spectrophotometer (actual measurement value: mg/ℓ)

| Cu lixiviation amount |
|---|
| 0.590 |

The lixiviation amount of the pure copper test piece shown in Table 3 is commuted, in order to meet the liquid-contacting area ratio of 1256 cm²/l, of the brass test piece, as 0.421 mg/l (0.59 mg/l×1256 cm²/l÷1760 cm²/l, and, as a result, it has been confirmed from the comparison between brass and pure copper that the copper lixiviation inclinations are greatly different. This is caused by the difference between ionization inclinations of copper and zinc. In the case of coexistence of less noble metal, such as zinc in brass, dissolution of less noble metal prevents dissolution of copper or dissolved copper is substituted by the dissolution of less noble metal into metalized metal, and, as a result, the copper lixiviation amount becomes small. On the other hand, in the case of pure copper, copper is merely lixiviated. It is found from these facts that preventing only less noble metal, such as zinc, from being eluted has the opposite effect of increasing the amount of copper lixiviated. Therefore, in the case of copper alloy, both copper elution prevention and zinc elution prevention have to be performed together.

The copper and zinc elution prevention method of the present embodiment comprises forming on at least a liquid-contact portion of a copper-alloy-made plumbing instrument a film of an organic substance comprising unsaturated fatty acid and coating with the film both copper and zinc in the surface layer of the liquid-contact portion of the plumbing instrument, thereby suppressing the elution of copper and zinc. As a consequence, it is possible to provide a copper-alloy-made plumbing instrument having suppressed the elution of copper and zinc in the surface layer of at least the liquid-contact portion. Furthermore, the film formed on the copper alloy is insoluble in water and, at the same time, has the function of preventing scale in tap water from adhering to the film due to water repellency of its alkyl group.

In this case, mono-unsaturated fatty acid is an organic substance containing oleic acid, or di-unsaturated fatty acid is an organic substance containing linoleic acid.

Furthermore, it is preferable to provide a drying step of drying the plumbing instrument at a predetermined temperature of 200° C. or less after the formation of the film of the unsaturated fatty acid containing oleic acid or at a predetermined temperature of 100° C. or less after the formation of the film of the unsaturated fatty acid containing linoleic acid.

At that time, it is preferable to further provide a step of retaining the plumbing instrument at a drying temperature of 50 to 70° C. to moderately evaporate wet of an aqueous organic film solution and a step of elevating the drying temperature to the predetermined temperature to take the drying step.

By the use of the method for preventing copper and zinc from being eluted from the copper-alloy-made plumbing instrument, the copper and zinc are suppressed from being eluted from the surface layer of at least the liquid-contact portion of the copper-alloy-made plumbing instrument.

The film-forming agent used in the method of preventing the copper and zinc elution in the present embodiment is a forming agent for forming a film on the surface layer of at least the liquid-contact portion of the copper-alloy-made plumbing instrument with an organic substance comprising unsaturated fatty acid used.

The unsaturated fatty acids described above are fatty acids each having at least one unsaturated carbon bond. These unsaturated fatty acids naturally exist in plenty and are classified depending on the number of unsaturated carbon bonds. Unsaturated fatty acid having one unsaturated carbon bond in hydrocarbon chain is called monovalent unsaturated fatty acid or mono-unsaturated fatty acid. That having plural unsaturated carbon bonds in hydrocarbon chain is called disconjugate polyenic acid or polyvalent unsaturated acid and, to be specific, that having two carbon bonds is di-unsaturated fatty acid, that having three carbon bonds is tri-unsaturated fatty acid, that having four carbon bonds is tetra-unsaturated fatty acid, that having five carbon bonds is penta-unsaturated fatty acid and that having six carbon bonds is hexa-unsaturated fatty acid.

In this case, the larger the number of the unsaturated carbon bond, the lower the melting point is. Since this advantageously acts on heterothermic animals including fish occurring in cold regions, there are clupanodonic acid originating from true sardine and nisinic acid originating from herring. However, while the larger the number of unsaturated carbon bond, the easier spontaneous oxidation occurs and the rapider the deterioration of fat and oil is, it is difficult to stably manage the film agent toward industrialization. Moreover, since these unsaturated fatty acids naturally exist in small amounts, these are expensive and, therefore, the films are not suitable because of high cost toward mass productivity. For this reason, the films are formed suitably of mono-unsaturated fatty acid or di-unsaturated fatty acid.

Each of the unsaturated fatty acids has two kinds of names used together, one being the IUPAC name according to the IUPAC nomenclature and the other being the trivial name having existed beforehand, and the unsaturated fatty acids will be described hereinafter. Though unsaturated fatty acids produced in plenty from natural objects have generally admixed therewith saturated fatty acids or other unsaturated fatty acids as unavoidable impurities, these are not adversely affected thereby. Examples of mono-unsaturated fatty acid are shown in Table 4, those of di-unsaturated fatty acid in Table 5, those of tri-unsaturated fatty acid in Table 6, those of tetra-unsaturated fatty acid in Table 7, those of penta-unsaturated fatty acid in Table 8 and those of hexa-unsaturated fatty acid in Table 9.

TABLE 4

Mono-unsaturated fatty acid

| IUPAC name | Trivial name |
|---|---|
| trans-2-butene acid | crotonic acid |
| cis-2-butene acid | isocrotonic acid |
| 3-butene acid | acetovinylic acid |
| 2-pentenoic acid | β-ethyl acrylic acid |
| 3-pentenoic acid | β-pentenoic acid |
| 4-pentenoic acid | acetoaryl acid |
| 2-hexene acid | β-propyl acrylic acid |
| 3-hexene acid | |
| 4-hexene acid | |
| 5-hexene acid | |
| 2-heptenoic acid | |
| 3-heptenoic acid | |
| 5-heptenoic acid | |
| 6-heptenoic acid | |
| cis-2-octenoic acid | |
| trans-2-octenoic acid | |
| 3-octenoic acid | |

TABLE 4-continued

Mono-unsaturated fatty acid

| IUPAC name | Trivial name |
|---|---|
| cis-2-nonenoic acid | |
| trans-2-nonenoic acid | |
| 3-nonenoic acid | |
| 2-decenoic acid | |
| 4-decenoic acid | obtusilic acid |
| 9-decenoic acid | caproleic acid |
| 9-undecenoic acid | 9-undecylenic acid |
| 10-undecenoic acid | 10-undecylenic acid |
| 2-dodecenoic acid | 2-lauroleic acid |
| 3-dodecenoic acid | linderic acid |
| 5-dodecenoic acid | 5-lauroleic acid |
| 11-dodecenoic acid | 11-lauroleic acid |
| 2-tridecenoic acid | |
| 12-tridecenoic acid | |
| 4-tetradecenoic acid | tsuzuic acid |
| 5-tetradecenoic acid | 5-myristoleic acid |
| 9-tetradecenoic acid | myristoleic acid |
| 2-pentadecenoic acid | |
| 14-pentadecenoic acid | |
| 2-hexadecenoic acid | 2-palmitoleic acid |
| 7-hexadecenoic acid | 7-palmitoleic acid |
| cis-9-hexadecenoic acid | palmitoleic acid |
| trans-9-hexadecenoic acid | trans-9-palmitoleic acid |
| 2-heptadecenoic acid | |
| cis-6-octadecenoic acid | petroselinic acid |
| trans-6-octadecenoic acid | petroselaidic acid |
| cis-9-octadecenoic acid | oleic acid |
| trans-9-octadecenoic acid | elaidic acid |
| cis-11-octadecenoic acid | cis-vaccenic acid |
| trans-11-octadecenoic acid | vaccenic acid |
| cis-9-icosenoic acid | gadoleic acid |
| cis-11-icosenoic acid | |
| trans-11-icosenoic acid | |
| cis-11-docosenoic acid | cetoleic acid |
| cis-13-docosenoic acid | erucic acid |
| trans-13-docosenoic acid | brassidic acid |
| cis-15-tetracosenoic acid | selacholeic acid |
| trans-15-tetracosenoic acid | trans-selacholeic acid |
| cis-17-hexacosenoic acid | |
| cis-21-tricontenoic acid | lumequennic acid |

TABLE 5

Di-unsaturated fatty acid

| IUPAC name | Trivial name |
|---|---|
| trans-2,cis-6-decadienoic acid | |
| cis-7,cis-10-pentadecadienoic acid | |
| cis-3,cis-6-hexadecadienoic acid | |
| cis-5,cis-9-hexadecadienoic acid | |
| cis-7,cis-10-hexadecadienoic acid | |
| cis-6,cis-10-hexadecadienoic acid | |
| cis-9,cis-12-hexadecadienoic acid | |
| cis-5,cis-9-heptadecadienoic acid | |
| cis-7,cis-10-heptadecadienoic acid | |
| cis-9,cis-12-heptadecadienoic acid | |
| trans-3,cis-9-heptadecadienoic acid | |
| cis-5,cis-9-octadecadienoic acid | |
| cis-6,cis-9-octadecadienoic acid | |
| cis-5,cis-11-octadecadienoic acid | |
| trans-5,cis-9-octadecadienoic acid | |
| cis-9,cis-12-octadecadienoic acid | linoleic acid |
| trans-9,trans-12-octadecadienoic acid | linolelaidic acid |
| cis-9,trans-12-octadecadienoic acid | |
| cis-10,cis-15-octadecadienoic acid | |
| cis-11,cis-15-octadecadienoic acid | |
| cis-11,cis-14-octadecadienoic acid | |
| cis-9,cis-12-nonadecadienoic acid | |
| cis-10,cis-13-nonadecadienoic acid | |
| cis-11,cis-14-nonadecadienoic acid | |
| cis-5,cis-11-icosadienoic acid | |
| cis-5,cis-13-icosadienoic acid | |
| cis-5,cis-15-icosadienoic acid | |

TABLE 5-continued

Di-unsaturated fatty acid

| IUPAC name | Trivial name |
|---|---|
| cis-7,cis-11-icosadienoic acid | |
| cis-7,cis-13-icosadienoic acid | |
| cis-8,cis-11-icosadienoic acid | |
| cis-10,cis-13-icosadienoic acid | |
| cis-11,cis-14-icosadienoic acid | |
| cis-13,cis-16-icosadienoic acid | |
| cis-5,cis-13-docosadienoic acid | |
| cis-7,cis-13-docosadienoic acid | |
| cis-7,cis-15-docosadienoic acid | |
| cis-5,cis-17-docosadienoic acid | |
| cis-9,cis-13-docosadienoic acid | |
| cis-5,cis-15-docosadienoic acid | |
| cis-9,cis-17-docosadienoic acid | |
| cis-13,cis-17-docosadienoic acid | |
| 5,9-pentacosadienoic acid | |
| 5,9-hexacosadienoic acid | |
| 5,9-heptacosadienoic acid | |
| 5,9-octacosadienoic acid | |
| 5,9-nonacosadienoic acid | |

TABLE 6

Tri-unsaturated fatty acid

| IUPAC name | Trivial name |
|---|---|
| cis-4,cis-7,cis10-hexadecatrienoic acid | |
| cis-6,cis-9,cis12-hexadecatrienoic acid | |
| cis-6,cis-10,cis14-hexadecatrienoic acid | hiragonic acid |
| cis-7,cis-10,cis13-hexadecatrienoic acid | |
| cis-9,cis-12,cis15-hexadecatrienoic acid | |
| cis-8,cis-11,cis14-heptadecatrienoic acid | |
| cis-9,cis-12,cis15-heptadecatrienoic acid | |
| trans-3,cis-9,cis-12-octadecatrienoic acid | calea |
| cis-5,cis-8,cis-11-octadecatrienoic acid | |
| trans-5,cis-9,cis-12-octadecatrienoic acid | pinolenic acid |
| cis-6,cis-9,cis-12-octadecatrienoic acid | γ-linolenic acid |
| cis-6,cis-10,cis-14-octadecatrienoic acid | |
| cis-9,cis-12,cis-15-octadecatrienoic acid | α-linolenic acid |
| cis-5,cis-8,cis-11-icosatrienoic acid | mead acid |
| cis-5,cis-11,cis-14-icosatrienoic acid | |
| cis-7,cis-10,cis-13-icosatrienoic acid | |
| cis-8,cis-11,cis-14-icosatrienoic acid | bishomo-γ-linolenic acid |
| cis-11,cis-14,cis-17-icosatrienoic acid | |
| cis-7,cis-10,cis-13-docosatrienoic acid | |
| cis-8,cis-11,cis-14-docosatrienoic acid | |
| cis-10,cis-13,cis-16-docosatrienoic acid | |
| 5,9,19-octacosatrienoic acid | |
| 5,9,23-nonacosatrienoic acid | |
| 5,9,23-tricontatrienoic acid | |

TABLE 7

Tetra-unsaturated fatty acid

| IUPAC name | Trivial name |
|---|---|
| cis-4,cis-7,cis10,cis13-hexadecatetraenoic acid | |
| trans-3,cis-9,cis-12,cis-15-octadecatetraenoic acid | |
| cis-6,cis-9,cis-12,cis-15-octadecatetraenoic acid | stearidonic acid |
| cis-5,cis-8,cis-11,cis-14-nonadecatetraenoic acid | |
| cis-4,cis-7,cis-10,cis-13-icosatetraenoic acid | |
| cis-5,cis-8,cis-11,cis-14-icosatetraenoic acid | arachidonic acid |
| cis-5,cis-11,cis-14,cis-17-icosatetraenoic acid | |
| 6,9,12,15-icosatetraenoic acid | |
| cis-7,cis-10,cis13,cis16-icosatetraenoic acid | |
| cis-8,cis-11,cis14,cis17-icosatetraenoic acid | |
| cis-7,cis-10,cis13,cis16-hencosatetraenoic acid | adrenic acid |
| cis-7,cis-10,cis13,cis16-docosatetraenoic acid | |
| cis-7,cis-13,cis16,cis19-docosatetraenoic acid | |
| cis-10,cis-13,cis16,cis19-docosatetraenoic acid | |

TABLE 8

Penta-unsaturated fatty acid

| IUPAC name | Trivial name |
| --- | --- |
| cis-3,cis-6,cis9,cis12,cis15-octadecapentaenoic acid | |
| cis-5,cis-8,cis-11,cis14,cis17-icosapentaenoic acid | icosapentaenoic acid |
| trans-5,trans-7,trans-9,cis-14,cis17-icosapentaenoic acid | |
| cis-7,cis-10,cis-13,cis-16,cis19-docosapentaenoic acid | clupanodonic acid |
| cis-4,cis-7,cis-10,cis-13,cis16-docosapentaenoic acid | osbond acid |

TABLE 9

Hexa-unsaturated fatty acid

| IUPAC name | Trivial name |
| --- | --- |
| Cis-4,cis-7,cis10,cis13,cis16,cis19-docosahexaenoic acid | docosahexaenoic acid |
| cis-6,cis-9,cis-12,cis15,cis18,cis21-tetracosahexaenoic acid | nisinic acid |

While unsaturated fatty acids naturally occur abundantly, crude oil extracted from mainly existing oilseed has admixed therein gummy matter, free fatty acid and pigments, such as carotenoids, chlorophylls. For this reason, unsaturated fatty acids having purity more than that of refined oil or refined canola oil obtained by removing these impurities are preferable. Incidentally, unsaturated fatty acids are digitalized under the JAS Standards, preferably contain 70% or more of oleic acid and further contain unavoidable impurities. The main unavoidable impurities are shown in Table 10.

TABLE 10

Straight-chain saturated fatty acids possibly admixed as unavoidable impurities

| IUPAC name | Trivial name |
| --- | --- |
| butanoic acid | butyric acid |
| pentanoic acid | valerianic acid (valeric acid) |
| hexanoic acid | caproic acid |
| heptanoic acid | enanthic acid |
| octanoic acid | caprylic acid |
| nonanoic acid | pelargonic acid |
| decanoic acid | capric acid |
| undecanoic acid | undecylic acid |
| dodecanoic acid | lauric acid |
| tridecanoic acid | tridecylic acid |
| tetradecanoic acid | myristic acid |
| pentadecanoic acid | pentadecylic acid |
| hexadecanoic acid | palmitic acid |
| heptadecanoic acid | margaric acid |
| octadecanoic acid | stearic acid |
| nonadecanoic acid | nonadecylic acid |

In this case, the unsaturated fatty acids used for film formation are insoluble in water and preferably have 10 or more carbon atoms in hydrocarbon chain. Particularly, organic substances, such as oleic acid of mono-unsaturated acid or linoleic acid of di-unsaturated acid are advantageously used. This is because the organic substances are inexpensive as a protective film-forming agent for prevention of copper and zinc elution for the purpose of forming a film (protective film) for prevention of copper and zinc elution because of their natural and abundant occurrence are easy to manage as film agent because of their stability. In consequence of forming the film of any of the organic substances on copper and zinc in copper alloy, copper and zinc can be prevented from elution.

Here, the presence of a film formed of an organic substance of oleic acid or linoleic acid has also been confirmed using the FT-IR analysis. The FT-IR is an apparatus for examining intensity distribution in each wavelength of infrared light utilizing Fourier transform with a Fourier-transform infrared spectrophotometer. An infrared spectroscopy comprises irradiating infrared rays on a substance to be measured and dispersing transmitted light to obtain spectra, thereby picking out a target substance. Since the spectra have shapes peculiar to molecules, films on a surface-polished brass test piece and an electrolytic zinc test piece (Zn: 99.97%) have been scraped and scraped substances have been irradiated with infrared light in the FT-IR analysis to analyze states in which films formed of the organic substance of oleic acid or linoleic acid are present. The results thereof are shown in FIG. 1.

In the peaks of oleic acid and linoleic acid shown in FIG. 1, independent crest peaks near the wavelength of 1750 cm$^{-1}$ characterizing a carboxylic group appear clearly. However, since the films on the brass test piece and electrolytic zinc test piece have no independent crest peak near 1750 cm$^{-1}$, it is found that all has been converted into different substances. Incidentally, since the peaks of the electrolytic zinc test piece move to the same positions as those of the stearic acid zinc shown as the comparative data, it is found that oleic acid and linoleic acid chemically react with each other to form a reactant and that the reactant is bonded to zinc. On the other hand, since the peaks of the brass test piece placed at the same positions as the peaks of the copper reactant of the stearic acid shown as further comparative data, it is found that the oleic acid and linoleic acid chemically react similarly with each other to form a reactant and that the reactant is bonded also to the copper-rich surface.

Figure 2:
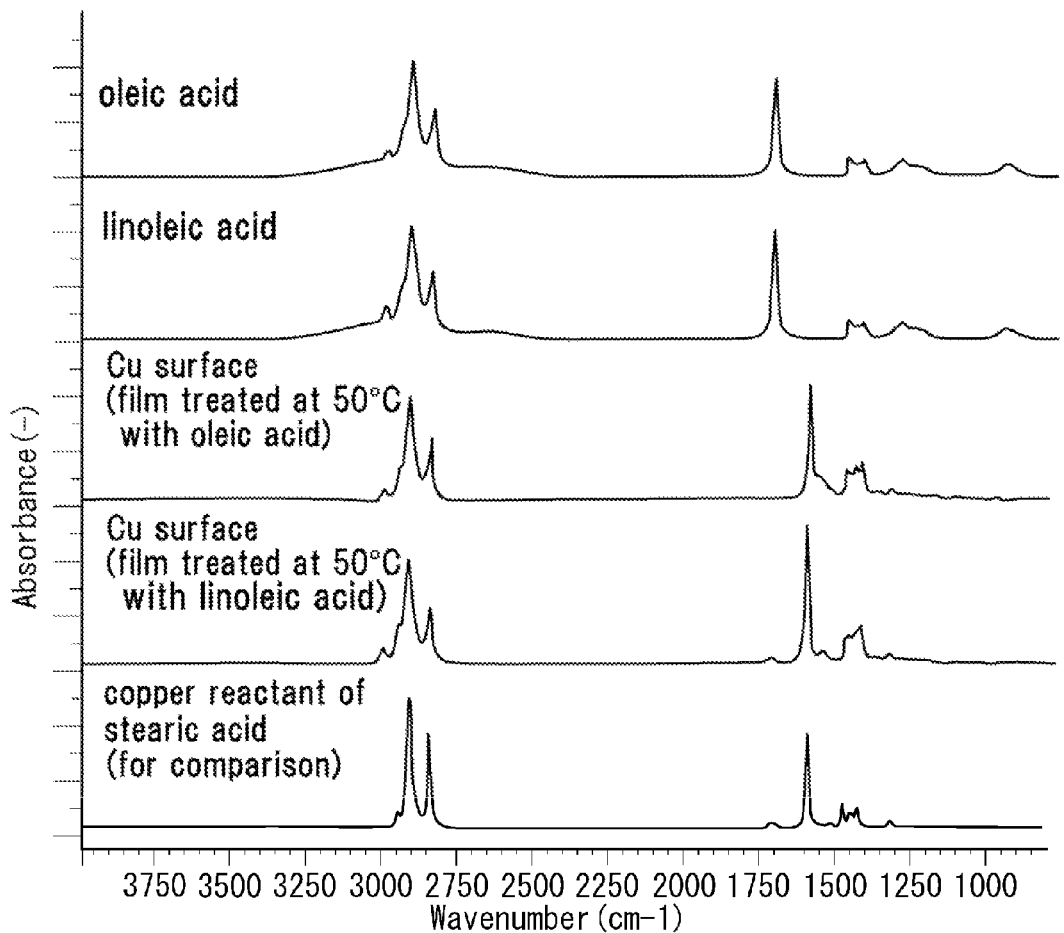
FIG. 2 shows graphs showing results of analysis of pure copper articles using oleic acid and linoleic acid according to the FT-IR analysis.

The copper surface has been confirmed using pure copper test pieces, and what are related to oleic acid and linoleic acid are shown in FIG. 2. In the peaks of oleic acid and linoleic acid, independent crest peaks near the wavelength of 1750 cm$^{-1}$ characterizing a carboxylic group appear clearly. However, since the films of both oleic acid and linoleic acid on the pure copper test pieces have no independent crest peak near 1750 cm$^{-1}$ in FIG. 2, it is found that all has been converted into different substances. Incidentally, since the peaks move to the same positions as those of the stearic acid copper shown as the comparative data in FIG. 2, it is found that the oleic acid and linoleic acid chemically react with copper.

In the meantime, the film of unsaturated fatty acid is not bonded to all of metals and cannot be bonded to the surface of metals capable of forming a passive film on stainless steel or aluminum, for example, through supply of oxygen into air or water. Therefore, it has been found that this film can only be bonded to the surfaces of limited metals including zinc and copper.

Figure 3:
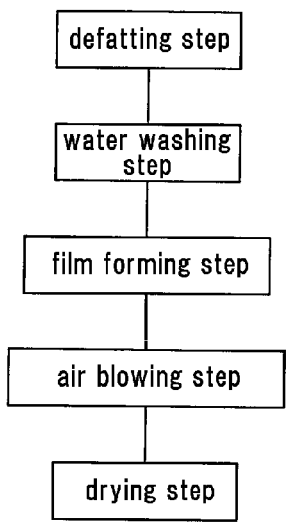
FIG. 3 is a flowchart showing a copper and zinc elution prevention step using an organic substance film of unsaturated fatty acid.

When forming on a copper-alloy-made plumbing instrument a film of an organic substance comprising unsaturated fatty acid, as shown in FIG. 3, in a film forming step after defatting and water washing steps, a plumbing instrument in an aqueous solution of an organic film that is unsaturated fatty acid is subjected to film formation treatment at a predetermined temperature for a predetermined time. As a result, the film is formed on the surface layer of the copper-alloy-made plumbing instrument to enable elution of copper and zinc to be prevented.

In an air blowing step after the film formation treatment, air is blown onto the surface of the copper-alloy-made plumbing instrument to remove the aqueous organic film solution adhering to the surface of the plumbing instrument and form a homogeneous film on the surface of the plumbing instrument. For this reason, when performing the air blowing treatment, air is strongly blown to prevent patch unevenness in a uniform state. In a drying step thereafter, the plumbing instrument is introduced into a furnace, such as a hemathermal drying furnace, for example, to dry the plumbing instrument at the predetermined temperature for the predetermined time, thereby forming a homogenous film on the surface of the plumbing instrument.

In the case of having formed on a liquid-contact portion a film of unsaturated fatty acid including oleic acid and linoleic acid, since a carboxylic group is contained in the unsaturated fatty acid, this functional group is likely to be bonded to copper or zinc in copper alloy and, particularly, elution of zinc in brass containing plenty of β phases having plenty of zincs can be prevented more effectively.

At that time, though the organic substance includes saturated fatty acids, for forming a film unsaturated fatty acids are preferable and the reason for it the molecular structures of the two kinds of fatty acids are different. In the case of heightening water insolubility and water repellency, the length of an alkyl group is important. In the case of the alkyl group in a saturated fatty acid, the larger its length, the wider the range of molecules moves about freely is to allow the molecules to exist in a wide three-dimensional space. For this reason, the intervals of the molecules of the saturated fatty acid bonded to zinc becomes large, the density of a film becomes crude, and the zinc comes into direct contact with water molecules highly frequently.

To the contrary, in the case of unsaturated fatty acid, since a double bond exists in its molecular structure, the molecules have planar structure, with that portion as an axis, and the range of the molecules moving about freely imposes restrictions. As a result, the intervals of the molecules bonded to zinc are narrowed to enable the density of the film to be increased.

Though unsaturated fatty acid containing plenty of double bonds includes docosahexaenoic acid (DHA) and nisinic acid, for example, these have a demerit of ready oxidization due to the presence of the plenty of double bonds. Since these having been oxidized are likely to generate foul odor, it is unfavorable to use these for a copper-alloy-made plumbing member using tap water as a fluid.

In view of the above, it is preferable to use unsaturated fatty acid, which comprises oleic acid or linoleic acid and which prevents foul odor from occurring, for copper and zinc elution prevention in the copper-alloy-made plumbing instrument. Oleic acid and linoleic acid are unsaturated fatty acids each having 18 carbon atoms and differ in that oleic acid has one double bond in its molecular structure and that linoleic acid has two double bonds in its molecular structure. The difference in number of the double bond leads to the difference in stability of the molecules having high temperatures. To be specific, the plumbing instrument is exposed to high temperatures in the drying step for forming a homogeneous film on the surface thereof, meaning that linoleic acid lacking in stability at high temperature is disadvantageous. Generally, linoleic acid has a necessary level of being refrigerated for stable storage and, in the case of demanding stability, oleic acid is preferred.

Figure 4:
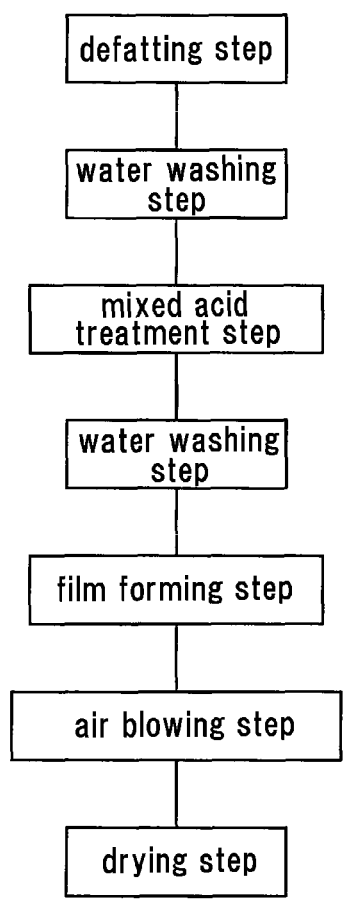
FIG. 4 is a flowchart showing an elution prevention step having a step of cleaning with mixed acid incorporated into the elution prevention step shown in FIG. 3.

Since the water standards have been severe in recent years, it is conceivable that lead or nickel elution preventing treatment is combined with the present method, for example. In this case, the combination is preferably carried out after cleaning with an acidic or alkaline solution. An example of introducing a cleaning step with mixed acid comprising 0.6 mol/l of nitric acid and 0.047 mol/l of hydrochloric acid as acid solutions is shown in FIG. 4. This is because the elution prevention treatment can be carried out relative to copper and zinc in copper alloy after removal of lead or aluminum segregated on the surface layer or of plating liquid residue brought about plating treatment.

Example 1

Next, an example on prevention of elution of copper and zinc in a copper-alloy-made plumbing instrument according to the present invention, such as a valve, pipe joint, faucet and copper pipe, will be described in detail. In order to prevent elution of copper and zinc in the copper-alloy-made plumbing instrument, it is necessary that the unsaturated fatty acid be bonded to both copper and zinc and, for attain this, that unsaturated fatty acid molecules having a homogeneous film formed in the air blowing step after the film formation treatment react chemically with copper and zinc on the surface of the copper alloy. To be specific, since collision of the unsaturated fatty acid molecules against the surface of the copper alloy produces reaction energy, it is desirable that the unsaturated fatty acid should have to be heated at the drying step.

On the other hand, since at least one double bond exists in the molecular structure of the unsaturated fatty acid and is rich in chemical reactivity, in heating the unsaturated fatty acid at the drying step, there is a possibility of the unsaturated fatty acid per se reacting when the heating temperature is more than a certain temperature.

Figure 5:
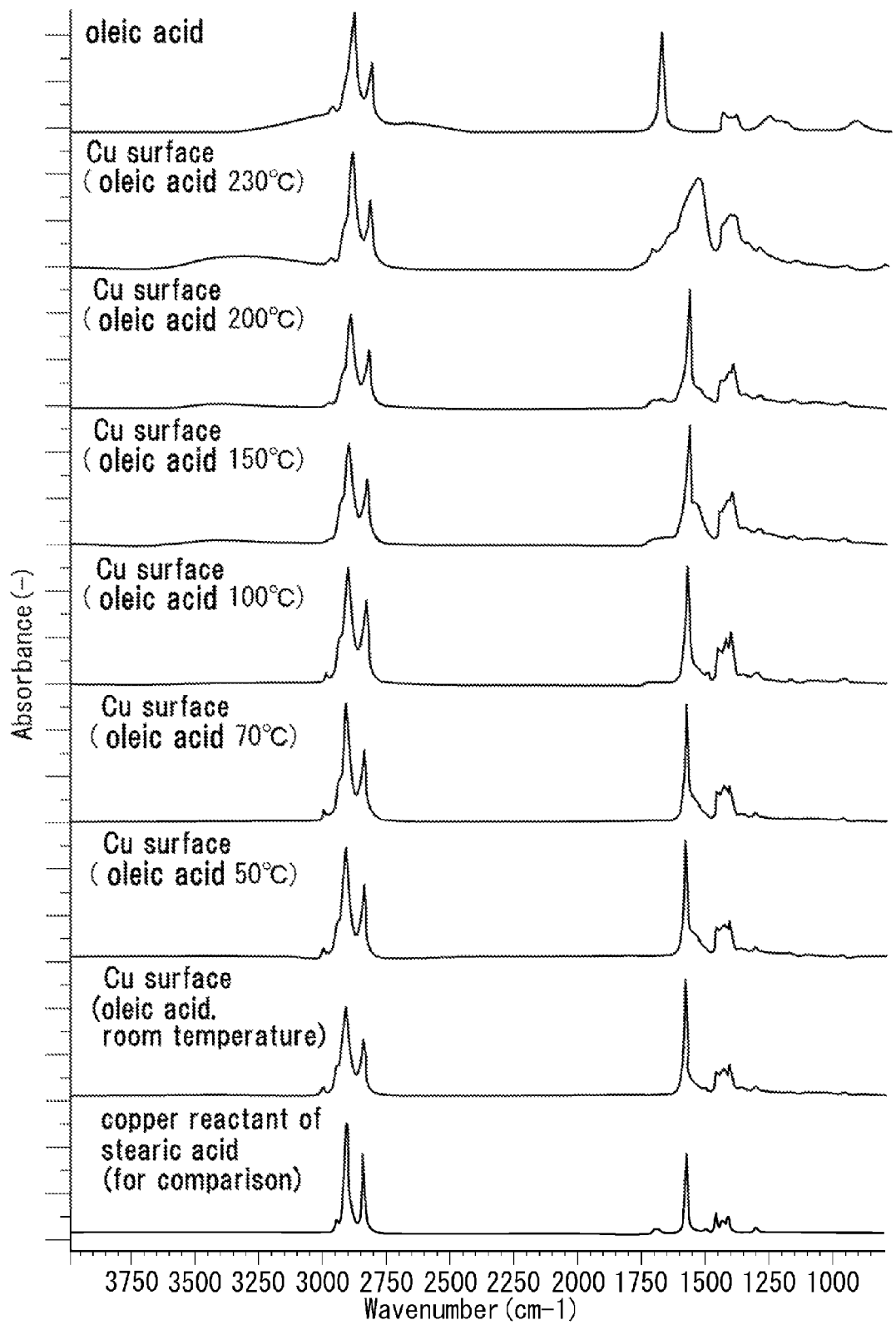
FIG. 5 shows graphs showing results of analysis of pure copper articles using oleic acids having different drying temperatures according to the FT-IR analysis.
Figure 6:
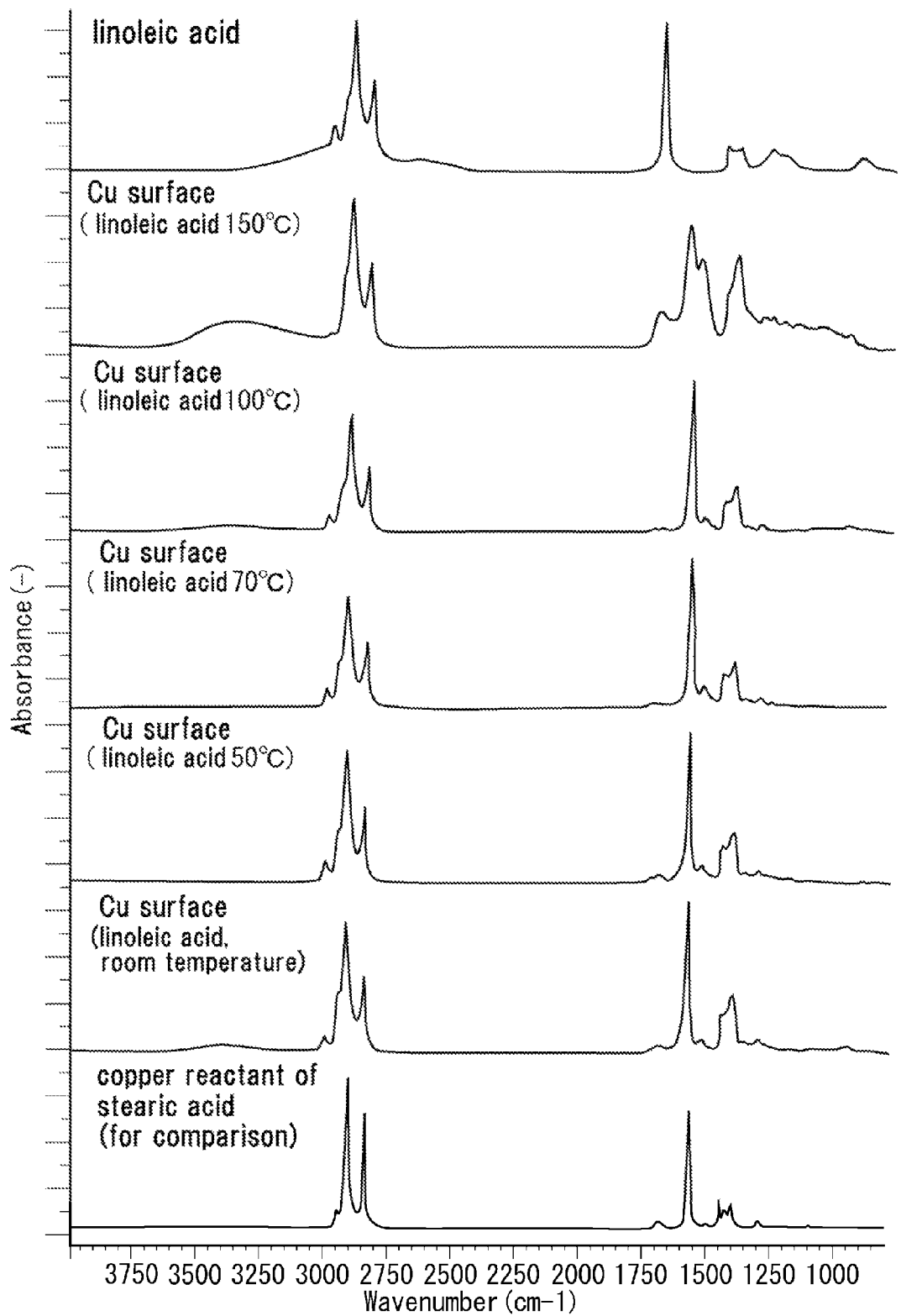
FIG. 6 shows graphs showing results of analysis of pure copper articles using linoleic acids having different drying temperatures according to the FT-IR analysis.
Figure 7:
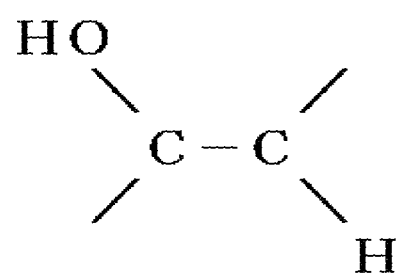
FIG. 7 shows a chemical formula showing reaction of water molecules with a double bond.

And so, since zinc that is less noble metal is possibly react directly oxidized by means of oxygen or wet in air at the time of high-temperature drying to make it difficult to evaluate the surface film, a pure copper test piece is represented assuming that a pure copper-made plumbing instrument is used to form films of oleic acid and linoleic acid, bonding states at the time of heating the plumbing instrument at the drying step and variations of the unsaturated fatty acid molecules are examined by the FT-IR, and the examination results are shown in FIG. 5 and FIG. 6. It is found from FIG. 5 and FIG. 6 that the films of oleic acid and linoleic acid are formed when the plumbing instruments are dried at 50° C. for 30 minutes and also at 70° C. for 30 minutes. The plumbing instruments of oleic acid and linoleic acid of normal room temperature are left standing at 25° C. for a prolonged time (144 hours). Incidentally, the evaluation using oleic acid in FIG. 5 is that the number of peaks of the oleic acid dried at 200° C. for 30 minutes in the neighborhood of 3000 $cm^{-1}$ showing a double bond decreases and instead moderate peaks appear in the neighborhood of 3250 to 3500 $cm^{-1}$. This is because part of the double bond rich in chemical reactivity has reacted with water (water vapor) contained in air in a drying furnace. To be specific, as shown in FIG. 7, water molecules are subjected to accretion reaction with the double bond.

Furthermore, the film of oleic acid dried at 230° C. for 30 minutes has wavelengths disturbed to a large extent as a hole as compared with the plumbing instruments dried at 200° C. or less. This shows that heat of 230° C. has thermally decomposed the film of oleic acid.

On the other hand, the evaluation using linoleic acid in FIG. 6 is that the number of peaks of the linoleic acid dried at 100° C. for 30 minutes in the neighborhood of 3000 $cm^{-1}$ showing the double bond decreases and instead moderate peaks appear in the neighborhood of 3250 to 3500 $cm^{-1}$. No peak of the linoleic acid dried at 150° C. for 30 minutes in the neighborhood of 3000 $cm^{-1}$ showing the double bond appears, and the wavelengths are disturbed to a large extent. Why the double bond of the linoleic acid is lost at lower temperature than that of the oleic acid is that the presence of the two double bonds rich in chemical reactivity lowers the melting point and boiling point of the linoleic acid to heighten the reactivity.

For this reason, it is desirable that the drying temperature in the case where unsaturated fatty acid is oleic acid is 200° C. or less and that in the case of linoleic acid is 100° C. or less.

The subsequent lixiviation evaluation was made based on JIS S3200-7. JIS S3200-7 stipulates that 1 l of an aqueous solution is composed of 1 ml of sodium hypochlorite (effective chlorine concentration: 0.3 mg/ml), 22.5 ml of a sodium hydrogen carbonate solution (0.04 mol/l), 11.3 ml of an aqueous calcium chloride solution (0.04 mol/l) and the balance of pure water and adjusted to pH of 7.0±0.1, hardness of 45±5 mg/l, alkalinity of 35±5 mg/l and chlorine residual of 0.3±0.1 mg/l. Incidentally, the lixiviation test method carried out excludes a conditioning step.

Furthermore, evaluation by the lixiviation test was performed using a pure copper test piece having the film of oleic acid formed thereon. The conditions were that the test piece was 20 mm square and 0.1 mm thick as described above and that the liquid-contacting area ratio was 1760 cm²/l. The results thereof are shown in Table 11. In the examination by FT-IR, it was found that the films were obtained at normal room temperature or 50° C. and that the copper reduction effects in the lixiviation test showed around 40% reduction at 70° C. and remarkable reduction exceeding 90% at a drying temperature exceeding 100° C.

TABLE 11

Copper lixiviation amount at each drying temperature by ICP emission spectrochemical analysis (according to JIS S3200-7)

| Drying Temperature | Lixiviation Amount (mg/ℓ) |
| --- | --- |
| Untreated | 0.590 |
| 70° C. | 0.350 |
| 100° C. | 0.0281 |
| 150° C. | 0.0164 |
| 180° C. | 0.0194 |
| 200° C. | 0.0535 |
| 230° C. | 0.590 |

Figure 8:
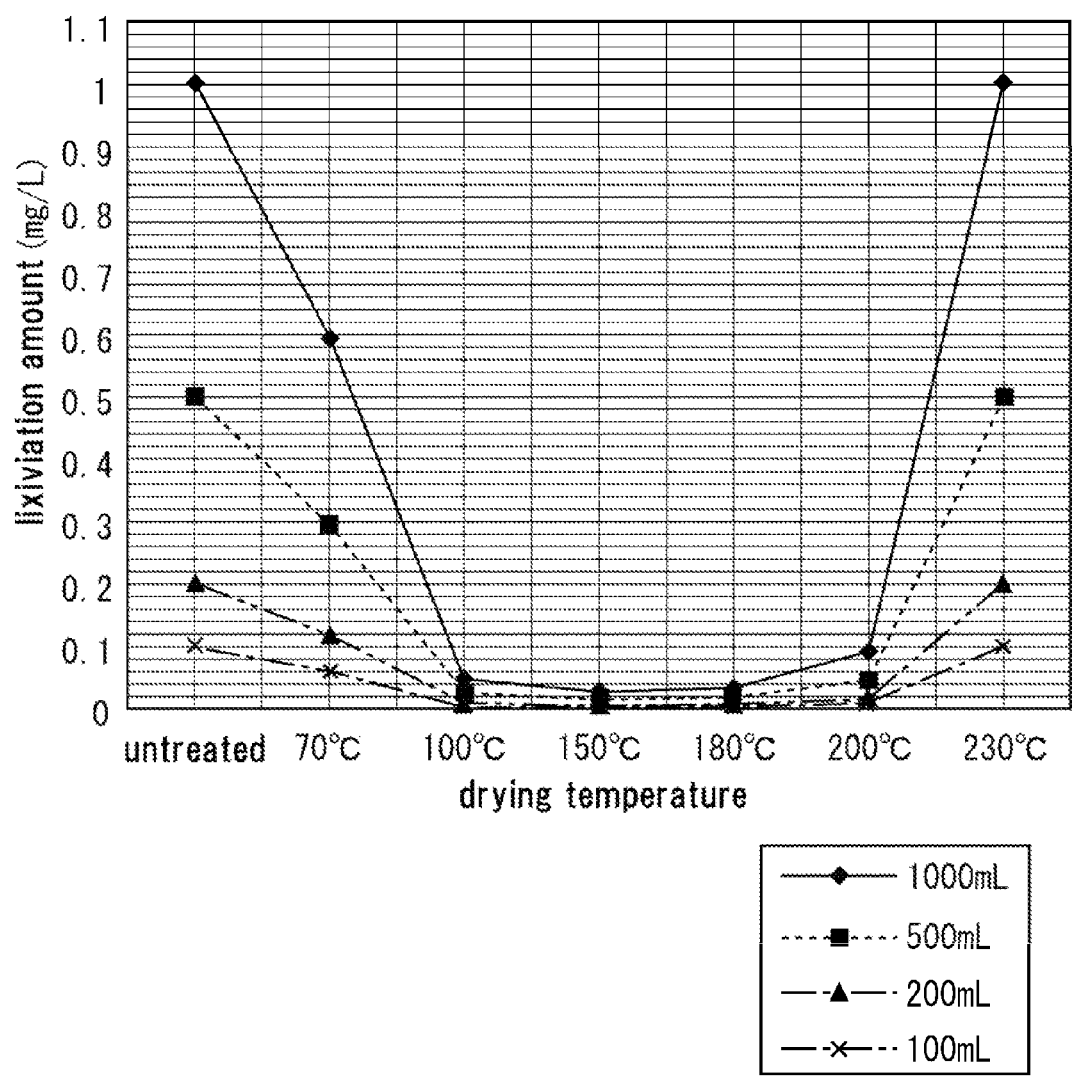
FIG. 8 shows graphs showing copper correction values in volumes of pure copper test pieces.

In recent years, reexamination of the water quality standards was reported because tap water having a high copper concentration exceeding by 50% the water quality standards was detected in a drinking water treatment plant using a copper-alloy-made plumbing instrument. However, assuming the case where the amount of 0.1 mg/l as shown in the table of the water supply faucets stipulated under JIS B2061 was treated as the copper standard, for example, with the water quality standards unaltered and the special case values for copper-alloy-made single faucets and hot-water and water mixing faucets eliminated, when correction values in comparison with the copper standard value of 0.1 mg/l assumed every volume in Table 12 in which the liquid-contacting area ratio of 1760 cm²/l, in the pure copper test pieces was in terms of that of 3000 cm²/l, in a large-sized faucet in view of the lixiviation test results in Table 11 were shown in FIG. 8, it was preferable that the lower limit of the drying temperature exceeded 70° C. and that the upper limit of the drying temperature was 200° C. or less in view of the evaluation by the FT-IR.

TABLE 12

Lixiviation amount in terms of liquid-contacting area ratio of 3000 cm²/ℓ (according to JIS S3200-7)

| Drying Temperature | Lixiviation Amount (mg/ℓ) |
| --- | --- |
| Untreated | 1.003 |
| 70° C. | 0.595 |
| 100° C | 0.0478 |

TABLE 12-continued

Lixiviation amount in terms of liquid-contacting area ratio of 3000 cm²/ℓ (according to JIS S3200-7)

| Drying Temperature | Lixiviation Amount (mg/ℓ) |
| --- | --- |
| 150° C. | 0.0279 |
| 180° C. | 0.0330 |
| 200° C. | 0.091 |
| 230° C. | 1.003 |

Example 2

Figure 9:
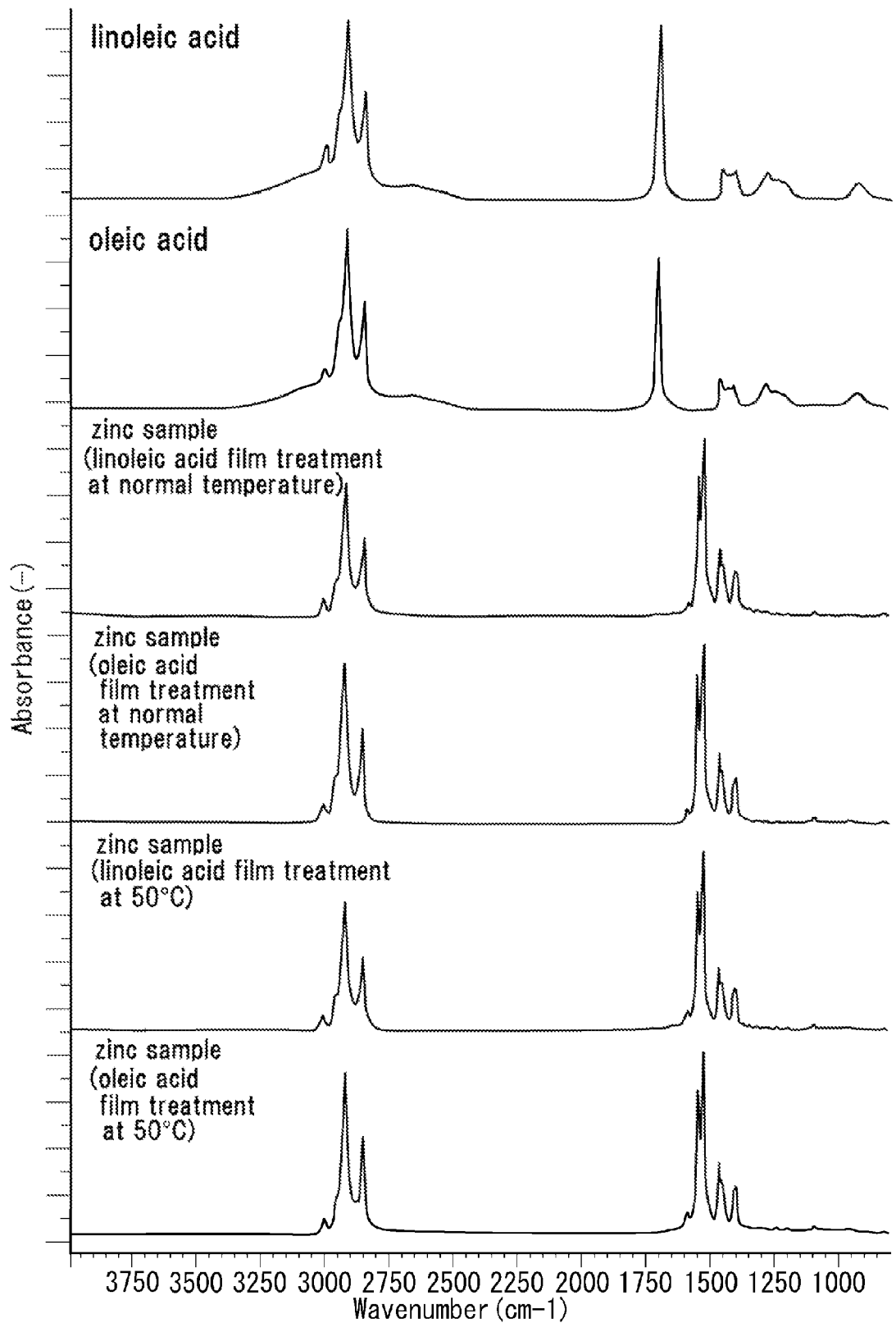
FIG. 9 shows graphs showing results of analysis of pure zinc articles using oleic acid and linoleic acid having different drying temperatures according to the FT-IR analysis.

In the case of copper alloy, such as bronze or brass, composed preponderantly of zinc and copper, it is necessary that the lixiviation of both copper and zinc be reduced. Films of oleic acid and linoleic acid were formed using a pure zinc test piece, the states of bonding thereof to zinc when heating at the drying step were examined by the FT-IR, and the results of examination are shown in FIG. 9. The oleic acid and linoleic acid of normal room temperature are left standing at 25° C. for a prolonged time (144 hours). In addition, the states of bonding at 70° C. for 30 minutes at the drying step and those using a brass test piece were examined. The results thereof are shown in Table 13. It was confirmed from the results shown in FIG. 9 that the films of oleic acid and linoleic acid that were unsaturated fatty acids were formed on zinc under the conditions of the temperature of 50° C. and the time of 30 minutes at the drying step. Furthermore, it was confirmed that the film was formed in the case of leaving the plumbing instrument of unsaturated fatty acid standing at normal temperature for 144 hours. However, it is said that the treatment for a prolonged time relative to actual products is not meaningful from the economical point of view.

In order to also make evaluation by the lixiviation test, brass test pieces selected as representatives and made of CAC203 in the shape of a circular cylinder having 20 mm in diameter and 10 mm in thickness and having a liquid-contacting area ratio of 1256 cm²/l, were subjected to defatting and water washing and then treatment with mixed acid comprising 0.6 mol/l of nitric acid and 0.047 mol/l of hydrochloric acid in accordance with the flowchart of FIG. 4. The object of the mixed acid treatment before the film forming step is to remove lead or aluminum segregated on the surface layer of copper alloy and then perform the treatment of preventing elution of copper and zinc. At the film forming step after the water washing step, the brass test pieces were immersed at 50° C. for 5 minutes in unsaturated fatty acid containing 0.8 wt % of oleic acid (aqueous organic film solution) to perform the treatment of preventing elution of copper and zinc. The films after the film forming treatment were subjected to air blowing and drying. At the air blowing step, air was blown to the brass test pieces for appropriate time to remove the aqueous organic film solution. At the drying step, the brass test pieces were introduced in a hemathermal furnace under each of standard conditions shown in Table 13 to dry the brass test pieces. The test results of lixiviation of copper and zinc from the brass test pieces having undergone the aforementioned steps are shown in Table 13.

TABLE 13

Copper and zinc lixiviation amounts of surface-treated brass test piece by ICP emission spectrochemical analysis (according to JIS S3200-7)

| | | Copper lixiviation amount (mg/ℓ) | Zinc lixiviation amount (mg/ℓ) |
|---|---|---|---|
| Standard 1 | Untreated | 0.196 | 2.69 |
| Standard 2 | Surface-treated (dried at 70° C. for 30 min | 0.061 | 0.0561 |
| Standard 3 | Surface-treated (dried at 70° C. for 30 min and then heated at 100° C. for 30 min | 0.00535 | 0.00697 |
| Standard 4 | Surface-treated (dried at 70° C. for 30 min and then heated at 150° C. for 30 min | 0.00535 | 0.0302 |
| Standard 5 | Surface-treated (dried at 100° C. for 30 min | 0.00535 | 0.00624 |
| Standard 6 | Surface-treated (dried at 150° C. for 30 min | 0.0101 | 0.0390 |
| Standard 7 | Surface-treated (dried at 200° C. for 30 min | 0.0100 | 0.0733 |

TABLE 14

Lixiviation amounts in terms of liquid-contacting area ratio of 3000 cm²/ℓ (according to JIS S3200-7)

| | | Copper lixiviation amount (mg/ℓ) | Zinc lixiviation amount (mg/ℓ) |
|---|---|---|---|
| Standard 1 | Untreated | 0.468 | 6.43 |
| Standard 2 | Surface-treated (dried at 70° C. for 30 min | 0.146 | 0.134 |
| Standard 3 | Surface-treated (dried at 70° C. for 30 min and then heated at 100° C. for 30 min | 0.0128 | 0.0167 |
| Standard 4 | Surface-treated (dried at 70° C. for 30 min and then heated at 150° C. for 30 min | 0.0128 | 0.0722 |
| Standard 5 | Surface-treated (dried at 100° C. for 30 min | 0.0128 | 0.0167 |
| Standard 6 | Surface-treated (dried at 150° C. for 30 min | 0.0241 | 0.0932 |
| Standard 7 | Surface-treated (dried at 200° C. for 30 min | 0.0239 | 0.174 |

It is found from the results in Table 13 that zinc subjected to drying at 70° C. for 30 minutes was reduced in lixiviation by about 1/50 and that the lixiviation of copper was reduced only by about 1/3. This level is identical in inclination to that of the pure copper test piece shown in Table 12 and dried at 70° C. The reason for this is that since copper is noble metal while zinc is less noble metal, in order for the molecules of the unsaturated fatty acid having formed the homogeneous film to be bonded intimately to copper, larger energy than that of zinc, i.e. a higher drying temperature, is needed.

However, when the drying temperature exceeds 70° C., wet of the aqueous organic film solution is rapidly evaporated and the film is formed while bubbles accompanied with boil are generated on the film surface. For this reason, there is a possibility of the film impairing its homogeneity. Therefore, in order to reduce lixiviation of copper to a large extent, the wet of the aqueous organic film solution is moderately evaporated at the drying temperature of 50 to 70° C. in standards 3 and 4 in Table 13 and thereafter the drying temperature is elevated in order to obtain energy of bonding to copper. As a result of the further evaluation under the temperature elevation condition, at large temperature elevation to 150° C., the copper lixiviation reduction was further effective when the drying temperature of 50 to 70° C. was once retained. Therefore, it is preferred that the wet of the aqueous organic film solution is moderately evaporated at the drying temperature of 50 to 70° C. and thereafter the drying temperature is elevated in order to obtain energy of bonding to copper.

Figure 10:
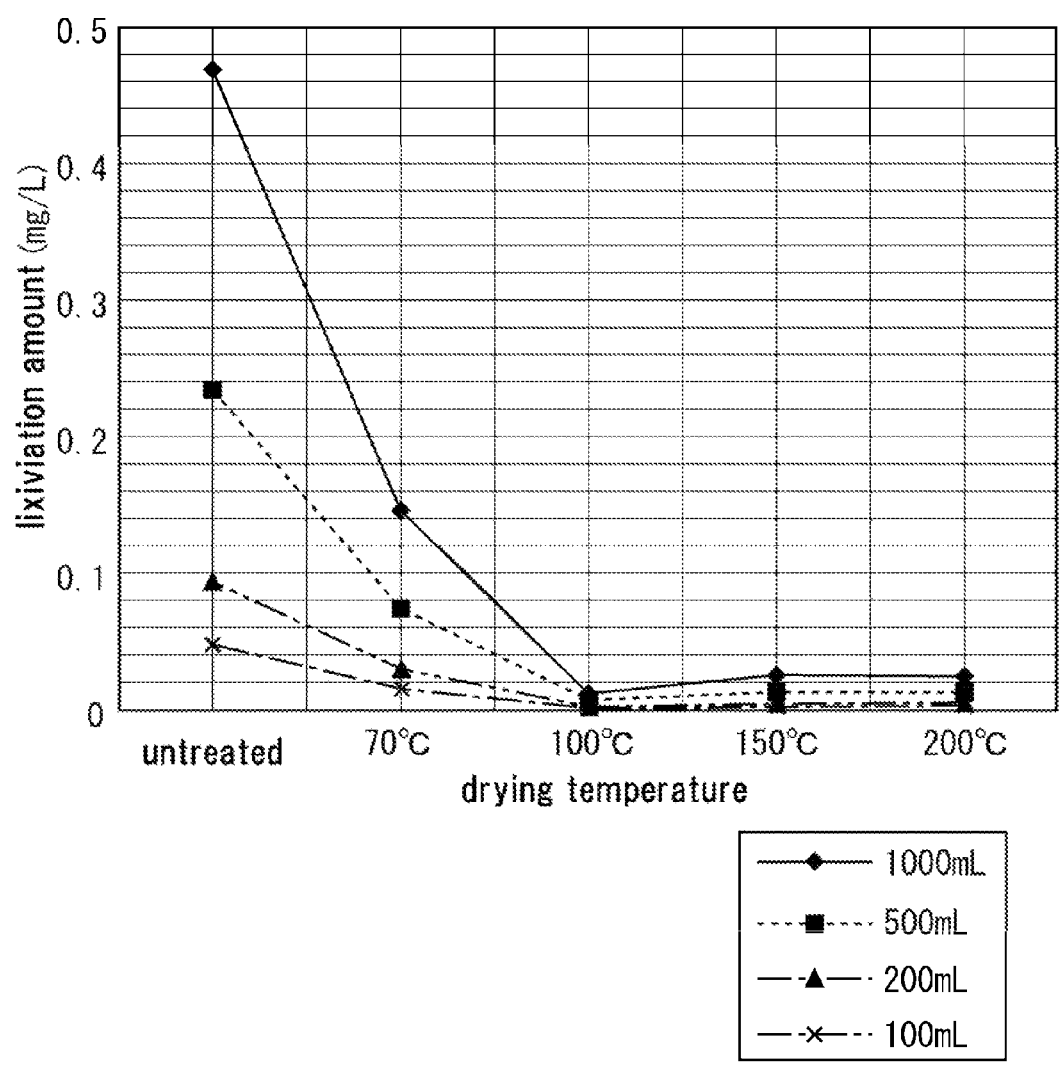
FIG. 10 shows graphs showing copper correction values in volumes of brass test pieces.
Figure 11:
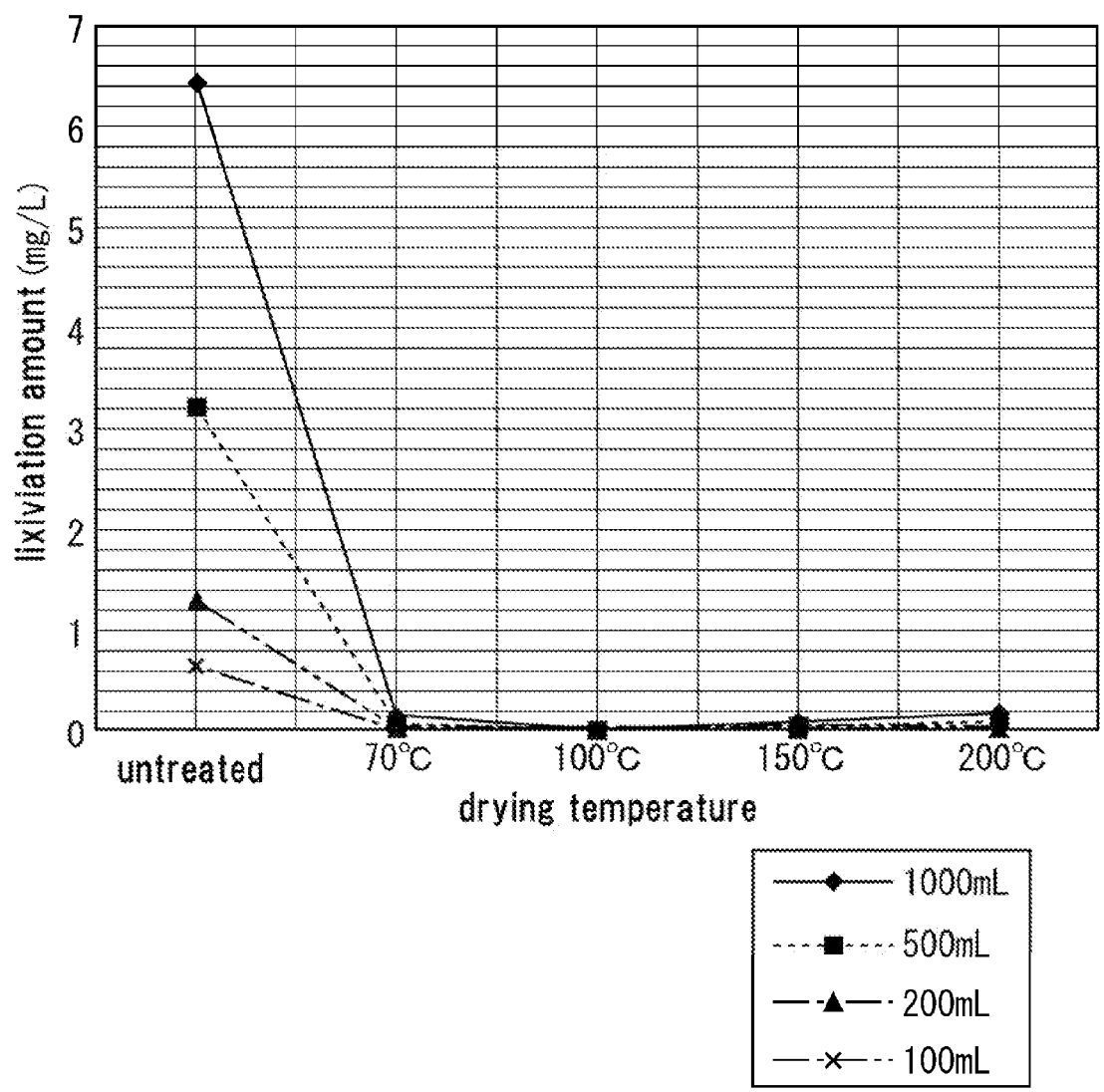
FIG. 11 shows graphs showing zinc correction values in volumes of brass test pieces.

For example, assuming that the case where the water standard is not altered and, as shown in the table of JIS B2061 water-supply faucets, the copper standard value of 0.1 mg/l and zinc standard value of 0.1 mg/l are used in the absence of the special case values applied to the single faucets and hot-water and water mixing faucets using copper alloy, the correction values in comparison with the copper and zinc standard values of 0.1 mg/l assumed every volume in Table 14 in which the liquid-contacting area ratio of 1256 cm²/l, in the brass test pieces was in terms of that of 3000 cm²/l, in the large-sized water-supply faucet in view of the lixiviation test results in Table 13 are shown in FIG. 10 and FIG. 11, and the lower limit of the drying temperature in each volume is obtained from FIG. 10 and FIG. 11. On the other hand, the upper limit of the drying temperature is preferably 200° C. or less according to the evaluation by the FT-IR.

Example 3

In recent years, leadless copper alloy having the content of lead suppressed as much as possible in a copper-alloy-made plumbing instrument including valves and pipe joints has grown popular. In view of this, it has been confirmed that the present invention is effective relative to other copper alloys. At first, a cylindrical test piece subjected to cutting work to have an outside diameter of 52 mm and an inside diameter of 32 mm, a length of 200 mm and a liquid-contacting area ratio of 1250 cm²/l, was fabricated. Two kinds of the conventionally used CAC203 containing lead and CAC802 specifying leadless copper alloy were prepared. Incidentally, the drying step after the film formation treatment was taken at 100° C. found in the previous examples. The lixiviation liquid was included in the cylindrical test pieces and the results obtained are shown in Table 15 and Table 16.

TABLE 15

Copper and zinc lixiviation amounts of surface-treated CAC203 test piece by ICP emission spectrochemical analysis (according to JIS S3200-7)

| | Copper lixiviation amount (mg/ℓ) | Zinc lixiviation amount (mg/ℓ) |
|---|---|---|
| Untreated | 0.0536 | 0.784 |
| Surface-treated | 0.0005 | 0.076 |

TABLE 16

Copper and zinc lixiviation amounts of surface-treated CAC804 test piece by ICP emission spectrochemical analysis (according to JIS S3200-7)

| | Copper lixiviation amount (mg/ℓ) | Zinc lixiviation amount (mg/ℓ) |
|---|---|---|
| Untreated | 0.0813 | 0.714 |
| Surface-treated | 0.0005 | 0.011 |

It was confirmed from the present results that both CAC203 and CAC804 showed the copper and zinc lixiviation reduction according the present invention. Incidentally, as the leadless copper alloys, CAC804, CAC901, CAC902, CAC903, CAC911, CAC901C, CAC902C, CAC903C and CAC911C are present. Any of these shows can show the effect of copper and zinc lixiviation reduction.

On the other hand, abroad, in the United States, for example, the lixiviation test evaluations are made in accordance with not JIS, but NSF/ANSI61. In section 8 of NSF/ANSI61 to which valves are applied, two kinds of test evaluations are made using lixiviation liquid which is 1 l of an aqueous solution comprising 1 ml (0.025 mol/l) of sodium hypochlorite, 25 ml (0.1 mol/l) of a dibasic sodium phosphate solution, 25 ml (0.04 mol/l) of a magnesium chloride solution and the balance of pure water to have a pH of 5 and lixiviation liquid which is 1 l of an aqueous solution comprising 1 ml (0.025 mol/l) of sodium hypochlorite, 50 ml, (0.1 mol/l) of sodium hydroxide, 50 ml (0.05 mol/l) of sodium tetraborate and the balance of pure water to have a pH of 10.

Therefore, in the United States, also in leadless copper alloy materials of ASTM B371 C6930, ASTM B584 C87850, ASTM B927 C27450 and ASTM B584 C89550 relative to the conventional copper alloys of ASTM B283 C3770, the present technique can reduce copper and reduce lixiviation using the lixiviation test evaluation in accordance with NSF/ANSI61.

Incidentally, the copper-alloy-made plumbing instruments including valves, pipe joints, faucets and copper pipes have been described in the present invention. However, this is not limitative. The present invention is also applicable to copper-alloy-made food processing equipment and copper-alloy-made cooking equipment requiring high thermal conductivity and to copper-alloy-made food preservation containers and copper-alloy-made beverage preservation containers requiring antibacterial activity.

What is claimed is:

1. A method for preventing copper and zinc from being eluted from a copper alloy plumbing instrument that includes valves and pipe joints, comprising:
    providing copper and zinc in a surface layer of a liquid-contact portion of a copper alloy plumbing instrument; and
    coating an organic substance comprising unsaturated fatty acid to form a film on at least the liquid-contact portion of the copper alloy plumbing instrument.

2. The method according to claim 1, wherein the unsaturated fatty acid is a mono-unsaturated fatty acid or a di-unsaturated fatty acid.

3. A copper alloy plumbing instrument that includes valves and pipe joints, wherein copper and zinc are prevented from being eluted from the copper alloy plumbing instrument according to the method of claim 2.

4. The method according to claim 2, wherein the mono-unsaturated fatty acid is oleic acid.

5. A copper alloy plumbing instrument that includes valves and pipe joints, wherein copper and zinc are prevented from being eluted from the copper alloy plumbing instrument according to the method of claim 4.

6. The method of claim 4, further comprising drying the coated plumbing instrument at 200° C. or less.

7. The method of claim 6, further comprising initially heating the coated plumbing instrument at a temperature of 50-70° C. to evaporate water from the organic film-forming substance before subsequently heating the coated plumbing instrument at the drying temperature.

8. A copper alloy plumbing instrument that includes valves and pipe joints, wherein copper and zinc are prevented from being eluted from the copper alloy plumbing instrument according to the method of claim 7.

9. A copper alloy plumbing instrument that includes valves and pipe joints, wherein copper and zinc are prevented from being eluted from the copper alloy plumbing instrument according to the method of claim 6.

10. The method according to claim 2, wherein the di-unsaturated fatty acid is linoleic acid.

11. The method of claim 10, further comprising drying the coated plumbing instrument at 100° C. or less.

12. The method of claim 11, further comprising initially heating the coated plumbing instrument at a temperature of 50-70° C. to evaporate water from the organic film-forming substance before subsequently heating the coated plumbing instrument at the drying temperature.

13. A copper alloy plumbing instrument that includes valves and pipe joints, wherein copper and zinc are prevented from being eluted from the copper alloy plumbing instrument according to the method of claim 10.

14. A copper alloy plumbing instrument that includes valves and pipe joints, wherein copper and zinc are prevented from being eluted from the copper alloy plumbing instrument according to the method of claim 1.

* * * * *